US006979102B2

(12) United States Patent
You

(10) Patent No.: US 6,979,102 B2
(45) Date of Patent: Dec. 27, 2005

(54) LIQUID CRYSTAL DISPLAY DEVICE

(75) Inventor: Dong Jae You, Kyongsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 57 days.

(21) Appl. No.: 10/720,157

(22) Filed: Nov. 25, 2003

(65) Prior Publication Data

US 2004/0105044 A1 Jun. 3, 2004

(30) Foreign Application Priority Data

Nov. 26, 2002 (KR) ..................... 10-2002-0074084

(51) Int. Cl.[7] ............................ F21V 29/00; F21V 7/20

(52) U.S. Cl. ........................ 362/218; 362/29; 362/225; 362/260; 362/373; 349/58; 349/60; 349/70

(58) Field of Search .............................. 362/27, 29–30, 362/31, 224, 234, 244, 330, 373, 561, 218, 362/225, 260; 349/58, 60, 70

(56) References Cited

U.S. PATENT DOCUMENTS

| | | | | |
|---|---|---|---|---|
| 4,129,900 | A * | 12/1978 | Sanz | 362/217 |
| 5,299,038 | A * | 3/1994 | Hamada et al. | 349/161 |
| 6,254,244 | B1 * | 7/2001 | Ukai et al. | 362/31 |
| 6,747,404 | B2 * | 6/2004 | Rha | 313/491 |
| 2002/0044437 | A1 * | 4/2002 | Lee | 362/31 |
| 2002/0113924 | A1 * | 8/2002 | Saito et al. | 349/112 |
| 2003/0123258 | A1 * | 7/2003 | Nitto et al. | 362/373 |

* cited by examiner

*Primary Examiner*—Stephen Husar
*Assistant Examiner*—Jason Han
(74) *Attorney, Agent, or Firm*—Morgan, Lewis & Bockius LLP

(57) ABSTRACT

A liquid crystal display device includes a liquid crystal display panel, a plurality of fluorescent lamps formed below the LCD panel extending along a first direction at first fixed intervals along a second direction perpendicular to the first direction, a case for supporting the plurality of fluorescent lamps, a plurality of wires attached to the case for absorbing and dissipating heat generated by the plurality of fluorescent lamps, and wire fixing plates for fixing the plurality of wires on the case.

40 Claims, 7 Drawing Sheets

LIQUID CRYSTAL DISPLAY DEVICE

The present invention claims the benefit of Korean Patent Application No. P2002-74084 filed in Korea on Nov. 26, 2002, which is incorporated by reference.

BACKGROUND OF THE INVENTION

1. Field of the Invention

The present invention relates to a display device, and more particularly, to a backlight device of a liquid crystal display device.

2. Discussion of the Related Art

In general, a liquid crystal display (LCD) device includes an LCD panel having a liquid crystal layer between two substrates, a driving circuit for driving the LCD panel, and a backlight device functioning to provide light to the LCD panel. The two substrates of the LCD panel includes a lower substrate, which has a thin film transistor array (TFT) array formed thereon. The lower substrate is bonded to an upper substrate, which has a color filter array formed thereon. The upper substrate is bonded to and separated from the lower substrate by a predetermined interval, wherein the liquid crystal layer is formed within the predetermined interval between the lower and upper substrates. Accordingly, images are displayed by controlling transmissivity of the light produced by the backlight device according to a voltage applied to a plurality of pixels.

Since the LCD panel does not produce light by itself, the LCD panel uses either ambient light or an additional light source, i.e., a backlight device Accordingly, the LCD panel is classified as transmitting-type and reflective-type LCD panels according to the type of light source. For example, the transmitting-type LCD panel uses the additional light source, whereas the reflective-type LCD panel uses the ambient light. In addition, the transflective-type LCD panel may use both the additional light source and the ambient light.

Backlight devices are commonly required to emit intense amounts of light while at the same time minimumizing power consumption. The backlight devices are classified as direct-type and edge-type according to a position of a fluorescent lamp. In the direct-type backlight device, the fluorescent lamp emits light to an entire rear side of the LCD panel. In the edge-type backlight device, the fluorescent lamp is formed at an edge of the LCD panel and the light emitted from the fluorescent lamp is provided at the rear side of the LCD panel through a light-guiding plate.

In the direct-type backlight device, a plurality of fluorescent lamps may be formed below the LCD panel, or a single fluorescent lamp having a bent portion may be formed. Accordingly, a predetermined interval must be maintained between the fluorescent lamps and the LCD panel in order to prevent silhouettes of the fluorescent lamps from being projected onto the LCD panel. In addition, a light-scattering system is formed to provide uniform light intensity onto the LCD panel. Thus, it is difficult to obtain a low profile LCD device when using the direct-type backlight device.

In the edge-type backlight device, since a light-guiding plate is used for uniformly scattering the light onto an entire surface of the LCD panel, luminance is low. Accordingly, the edge-type backlight device is used in LCD devices requiring low profiles, such as notebook computers, and the direct-type backlight device is used in LCD devices requiring large-sized screens and high luminance.

FIG. 1 is a cross sectional view of a liquid crystal display device having a direct-type backlight device according to the related art. In FIG. 1, an LCD device includes an LCD panel 1, a plurality of fluorescent lamps 5, a light-scattering system 2, a reflecting plate 4, a plurality of supports 6, and a case 9. The LCD panel displays images by controlling transmissivity of light produced by the plurality of fluorescent lamps 5 formed below the LCD panel at fixed intervals. In addition, the light-scattering system 2 is formed between the LCD panel 1 and the plurality of fluorescent lamps 5 to prevent silhouettes of the plurality of fluorescent lamps 5 from being projected onto a display surface of the LCD panel 1, and to provide a uniform limunance of the light produced by the plurality of fluorescent lamps 5. The plurality of supports 6 provide support to the light-scattering system 2. The reflecting plate 4 is formed below the plurality of fluorescent lamps 5 in order to reflect the light emitted from the plurality of fluorescent lamps 5 onto the LCD panel 1, wherein the case 9 supports the plurality of fluorescent lamps 5 and the reflecting plate 4.

FIG. 2 is a perspective view of a direct-type backlight device according to the related art. In FIG. 2, a direct-type backlight device includes a plurality of fluorescent lamps 5 formed at fixed intervals, a case 9 for fixing and supporting the plurality of fluorescent lamps 5, a light-scattering system 2*a*, 2*b*, and 2*c* formed between the LCD panel 1 and the plurality of fluorescent lamps 5, and a reflecting plate 4 formed on an inner side of the case 9 to concentrate the light emitted from the plurality of fluorescent lamps 5 onto a display part of the LCD panel. The light-scattering system 2*a*, 2*b*, and 2*c* includes a plurality of diffusion sheets and plates, and the reflecting plate 4 and the case 9 are formed of a material having a high heat conductivity, such as Al materials. In addition, the plurality of fluorescent lamps 5 are cold cathode fluorescent lamps (CCFL), wherein electrodes are formed at both ends of the lamps 5. Accordingly, the plurality of fluorescent lamps 5 emit light when power is supplied to the electrodes at both ends of the plurality of fluorescent lamps 5, wherein the ends of the plurality of fluorescent lamps 5 are inserted into holes formed at both sides of the case 9.

When the plurality of fluorescent lamps 5 emit the light, a large portion of the emitted light is directly incident onto the light-scattering system 2*a*, 2*b*, and 2*c*, and a small portion of the emitted light is reflected by the reflecting plate 4 and redirected onto the light-scattering system 2*a*, 2*b*, and 2*c*. The light-scattering system 2*a*, 2*b*, and 2*c* scatters the incident light to provide uniformity onto the LCD panel 1, thereby displaying images.

When the light emitted from the plurality of fluorescent lamps 5 is incident onto the LCD panel 1, the plurality of fluorescent lamps 5 produce significant amounts of heat. Most of the heat emitted from the fluorescent lamp 5 is transmitted to the LCD panel 1 through the light-scattering system 2*a*, 2*b*, and 2*c*. However, some of the heat is dissipated to the surrounding by being absorbed by the reflecting plate 4 and transmitted to the case 9.

However, the direct-type backlight device has the following disadvantages. First, as a size of the LCD panel 1 increases, the number of fluorescent lamps 5 increases, thereby increasing the amount of heat produced by the plurality of fluorescent lamps 5. Second, as the amount of heat produced by the plurality of fluorescent lamps 5 increases, the lifetime of the plurality of fluorescent lamps 5 decreases. Third, the amount of heat produced by the plurality of fluorescent lamps 5 adversely affects the LCD panel 1.

One solution to reduce the amount of heat produced by the-plurality of fluorescent lamps 5 involves using a cooling fan. However, the cooling fan increases the unit manufacturing costs of the LCD device, increases power consumption of the LCD device, and generates noise.

SUMMARY OF THE INVENTION

Accordingly, the present invention is directed to a liquid crystal display device that substantially obviates one or more problems due to limitations and disadvantages of the related art.

An object of the present invention is to provide a liquid crystal display device having a wire configuration to absorb and dissipate heat generated from fluorescent lamps of a backlight device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes a liquid crystal display panel, a plurality of fluorescent lamps formed below the LCD panel extending along a first direction at first fixed intervals along a second direction perpendicular to the first direction, a case for supporting the plurality of fluorescent lamps, a plurality of wires attached to the case for absorbing and dissipating heat generated by the plurality of fluorescent lamps, and wire fixing plates for fixing the plurality of wires on the case.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
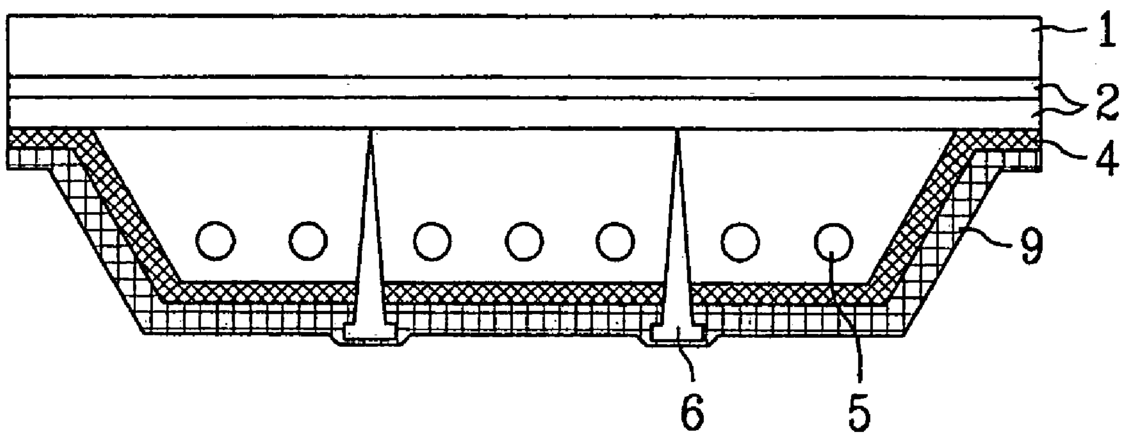
FIG. 1 is a cross sectional view of a liquid crystal display device having a direct-type backlight device according to the related art.
Figure 2:
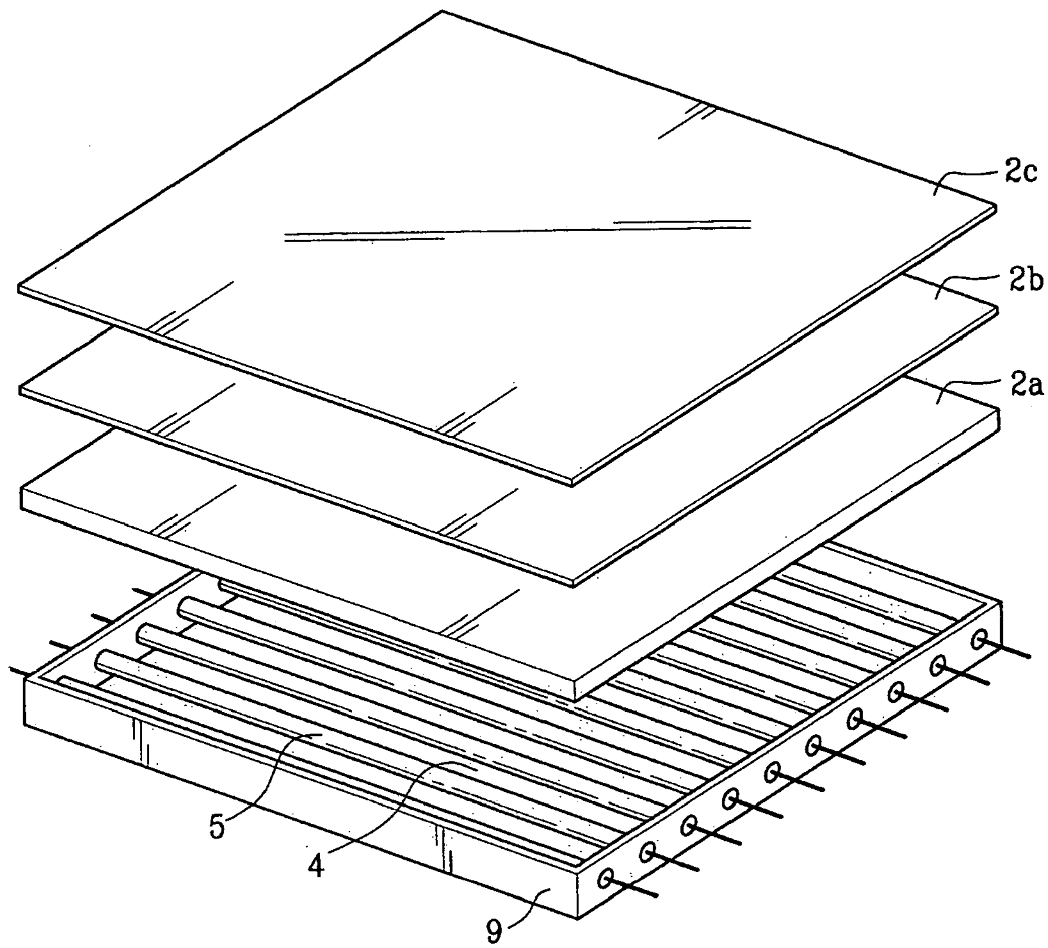
FIG. 2 is a perspective view of a direct-type backlight device according to the related art.
Figure 3:
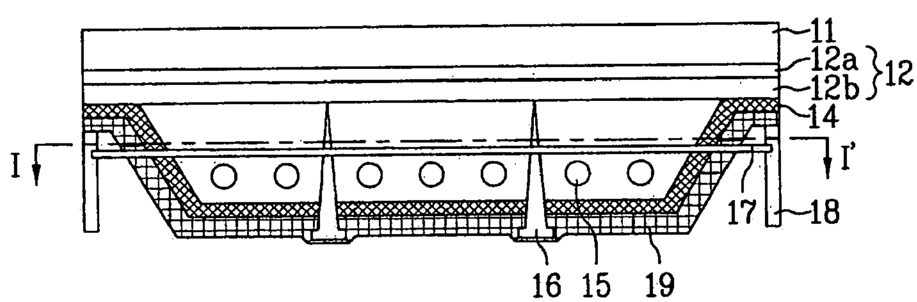
FIG. 3 is a cross sectional view of an exemplary liquid crystal display device having a direct-type backlight device according to the present invention.

FIG. 3 is a cross sectional view of an exemplary liquid crystal display device having a direct-type backlight device according to the present invention. In FIG. 3, an LCD device may include an LCD panel 11, a plurality of fluorescent lamps 15, a light-scattering system 12, a reflecting plate 14, a case 19, a plurality of wires 17, and wire fixing plates 18. Accordingly, the LCD panel may display images by controlling transmissivity of light produced by the plurality of fluorescent lamps 15 formed below the LCD panel 11 at fixed intervals. The light-scattering system 12 may be formed between the LCD panel 11 and the plurality of fluorescent lamps 15 to prevent silhouettes of the plurality of fluorescent lamps 15 from being projected onto a display surface of the LCD panel 11, and to provide a uniform luminance of light. The reflecting plate 14 may be formed below the plurality of fluorescent lamps 15 in order to reflect the light emitted from the plurality of fluorescent lamps 15 onto the LCD panel 11, wherein the case 19 may provide support for the plurality of fluorescent lamps 15 and the reflecting plate 14. The plurality of wires 17 may be formed between the light-scattering system 12 and the plurality of fluorescent lamps 15 in order to absorb and dissipate the heat produced by the plurality of fluorescent lamps 15, wherein the wire fixing plate 18 may fix the plurality of wires 17 onto the case 19. Accordingly, the plurality of wires 17 may include end portions extending through sidewall portions of the case 19, as well as sidewall portions of the reflecting plate 14, to be connected to the wire fixing plate 18.

In addition, a plurality of supporters 16 may be provided to support the light-scattering system 12. The plurality of supporters 16 may prevent the light-scattering system 12 from sagging due to gravity or high temperatures. The plurality of supporters 16 may have circular cone shapes, thereby preventing silhouettes of the supporters from being projected onto the LCD panel 11.

The plurality of wires 17 may absorb the heat generated by the plurality of fluorescent lamps 15, and may transmit the heat to the wire fixing plate 18 to prevent an increase in an internal temperature of the case 19. The plurality of wires 17 may be formed of material(s) having relatively high heat conductivity, such as Al- or Cu-based materials, and may have diameters small enough to prevent the silhouettes of the wires 17 from being projected onto the LCD panel 11. Accordingly, the plurality of wires 17 may be almost invisible along an exterior of the case 19.

The wire fixing plate 18 may fix the plurality of wires 17 using solder or screws, and may function as a heat-radiating plate for emitting the heat transmitted through the plurality of wires 17 to the exterior of the case 19. In addition, the case 19 may emit the heat transmitted by the reflecting plate 14 to the exterior of the case 19. The wire fixing plates 18 and the case 19 may be formed of material(s) having relatively high heat conductivity, such as Al- or Cu-based materials. The light-scattering system 12 may include a diffusion plate 12*b* for uniformly diffusing the light emitted from the plurality of fluorescent lamps 15 and an optical sheet 12*a* for concentrating the uniformly diffused light onto the LCD panel 11, thereby improving luminance.

Figure 4A:
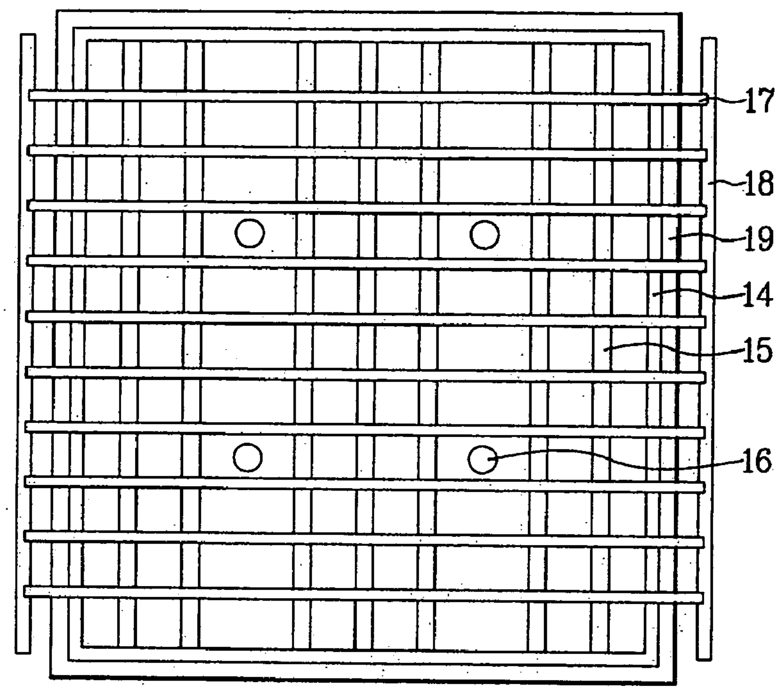
FIGS. 4A to 4C are plan views along I–I' of FIG. 3 of exemplary wire configurations according to the present invention.
Figure 4B:
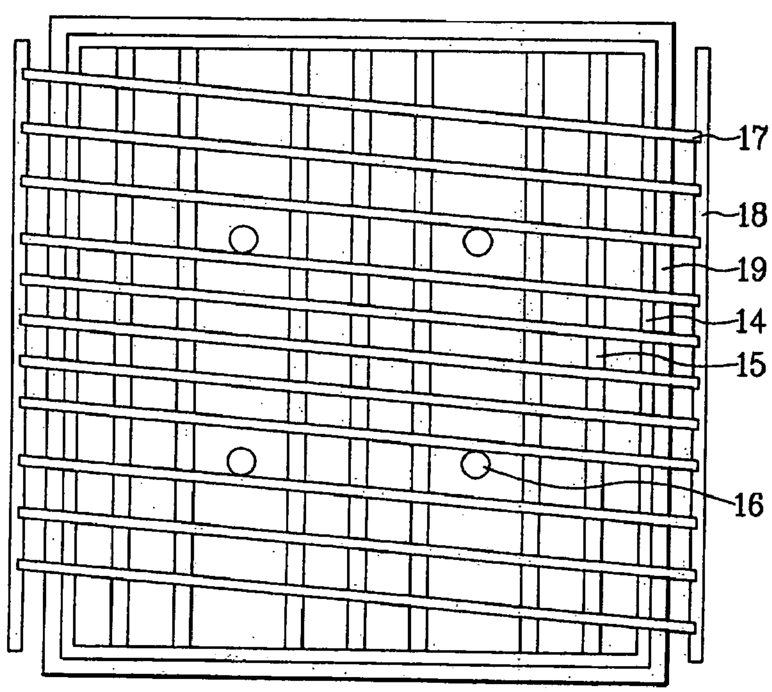
Figure 4C:
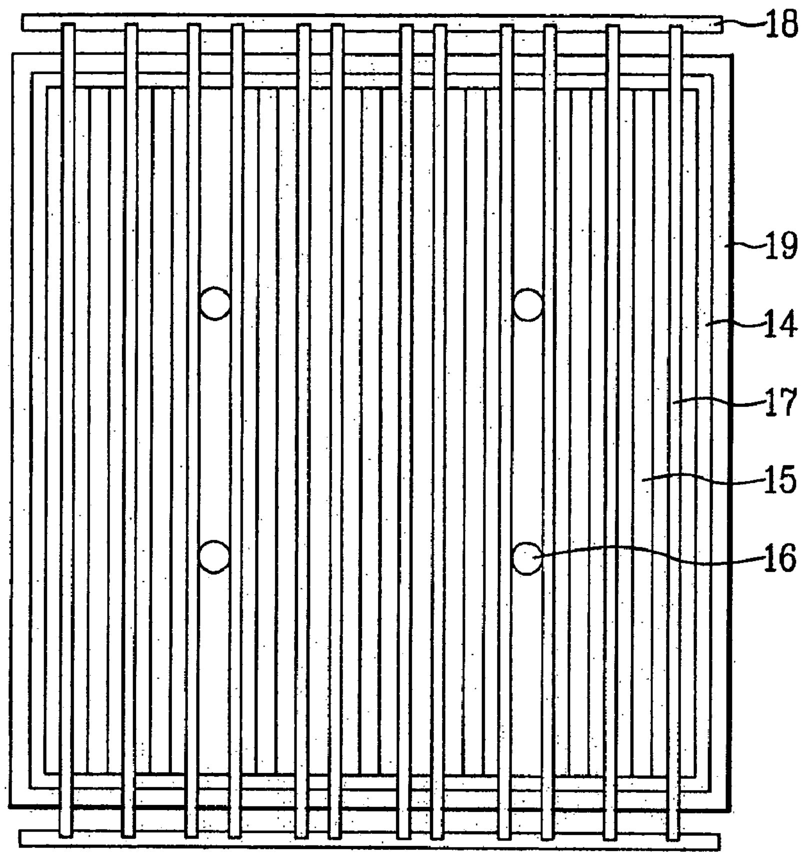

FIGS. 4A to 4C are plan views along I'I' of FIG. 3 of exemplary wire configurations according to the present invention. In FIG. 4A, a first configuration of the plurality of wires 17 may be formed at an interior of the case 19 between the plurality of fluorescent lamps 15 and the light-scattering system 12 (in FIG. 3) to extend along a first direction perpendicular to a second direction of the plurality of fluorescent lamps 15 at fixed intervals. In addition, each of the plurality of supporters 16 may be disposed within a region bound by adjacent ones of the plurality of wires 17 and adjacent ones of the plurality of fluorescent lamps 15.

In FIG. 4B, a second configuration of the plurality of wires 17 may be formed at the interior of the case 19 between the plurality of fluorescent lamps 15 and the light-scattering system 12 (in FIG. 3) along a first angled direction with respect to a second direction of the plurality of fluorescent lamps 15 at fixed intervals. Although the plurality of wires 17 are shown to have relatively small angles with respect to the second direction of the plurality of fluorescent lamps 15, the first angled direction may be within a range of between about 0° and about 90° with respect to the second direction of the plurality of fluorescent lamps 15. In addition, each of the plurality of supporters 16 may be disposed within a region bound by adjacent ones of the plurality of wires 17 and adjacent ones of the plurality of fluorescent lamps 15.

In FIG. 4C, a third configuration of the plurality of wires 17 may be formed at an interior of the case 19 between the plurality of fluorescent lamps 15 and the light-scattering system 12 (in FIG. 3) to extend along a first direction parallel to a second direction of the plurality of fluorescent lamps 15 at fixed intervals. In addition, each of the plurality of wires may be disposed between each of the plurality of fluorescent lamps 15. Each of the plurality of supporters 16 may be disposed within a region bound by adjacent ones of the plurality of wires 17.

Although not shown, the plurality of wires 17 in FIGS. 4A to 4C may be confined within a vertical space between the plurality of fluorescent lamps 15 and the reflecting plate 14 (in FIG. 3) and within sidewall portions of the case 19, wherein the plurality of wires 17 may be fixed onto the case 19 by the wire fixing plates 18. Accordingly, diameters of the plurality of wires 17 may be relatively larger than the diameter of the plurality of wires 17 provided between the plurality of fluorescent lamps 15 and the light-scattering system 12 (in FIG. 3).

Figure 5:
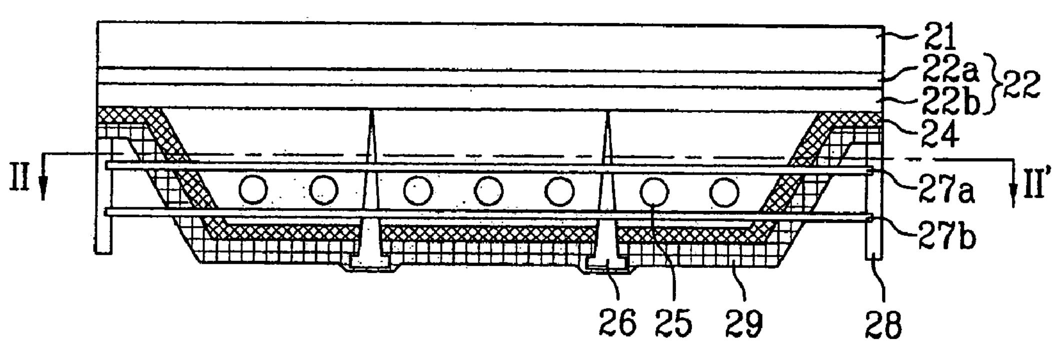
FIG. 5 is a cross sectional view of another exemplary liquid crystal display device according to the present invention.

FIG. 5 is a cross sectional view of another exemplary liquid crystal display device according to the present invention. In FIG. 5, an LCD device may include an LCD panel 21, a plurality of fluorescent lamps 25, a light-scattering system 22, a reflecting plate 24, a case 29, a plurality of first wires 27*a*, a plurality of second wires 27*b*, wire fixing plates 28, and a plurality of supporters 26. The LCD panel 21 may display images by controlling transmissivity of light produced by the plurality of fluorescent lamps 25 formed below the LCD panel 21 at fixed intervals. The light-scattering system 22 may be formed between the LCD panel 21 and the plurality of fluorescent lamps 25 in order to prevent silhouettes of the fluorescent lamps 25 from being projected onto a display surface of the LCD panel 21, and to provide uniform luminescent light. In addition, the reflecting plate 24 may be formed below the plurality of fluorescent lamps 25 in order to reflect the light emitted from the plurality of fluorescent lamps 25 onto the LCD panel 21, wherein the case 29 may provide support to the plurality of fluorescent lamps 25 and the reflecting plate 24.

The plurality of first wires 27*a* may be formed between the light-scattering system 22 and the plurality of fluorescent lamps 25 in order to absorb and dissipate heat generated by the plurality of fluorescent lamps 25. The plurality of second wires 27*b* may be formed between the plurality of fluorescent lamps 25 and the reflecting plate 24 to absorb and dissipate the heat generated by the plurality of fluorescent lamps 25. In addition, the wire fixing plates 28 may fix end portions of the plurality of first and second wires 27*a* and 27*b* onto the case 29, and the plurality of supporters 26 may provide support to the light-scattering syste 22. The light-scattering system 22 may include a diffusion plate 22*b* for uniformly diffusing the light emitted by the plurality of fluorescent lamps 25 and an optical sheet 22*a* for concentrating the uniformly diffused light onto the LCD panel 21, thereby improving luminance.

Figure 6A:
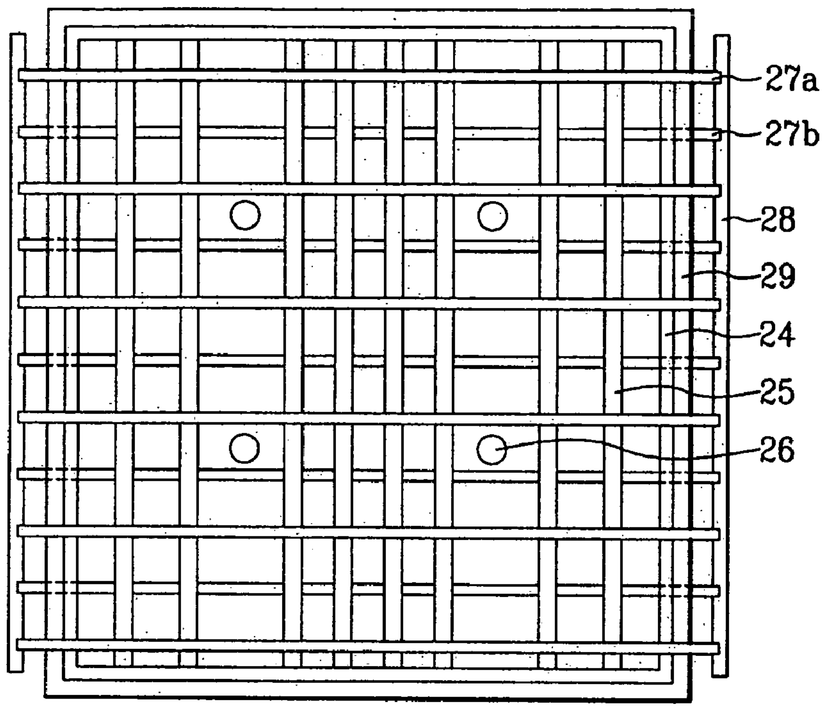
FIGS. 6A to 6C are plan views along II–II' of FIG. 5 of other exemplary wire configurations according to the present invention.
Figure 6B:
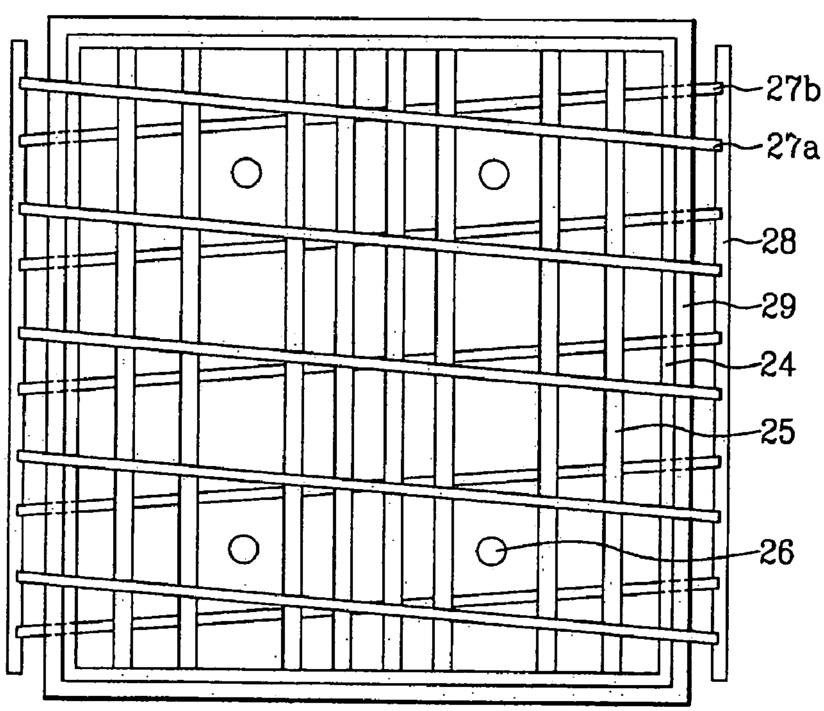
Figure 6C:
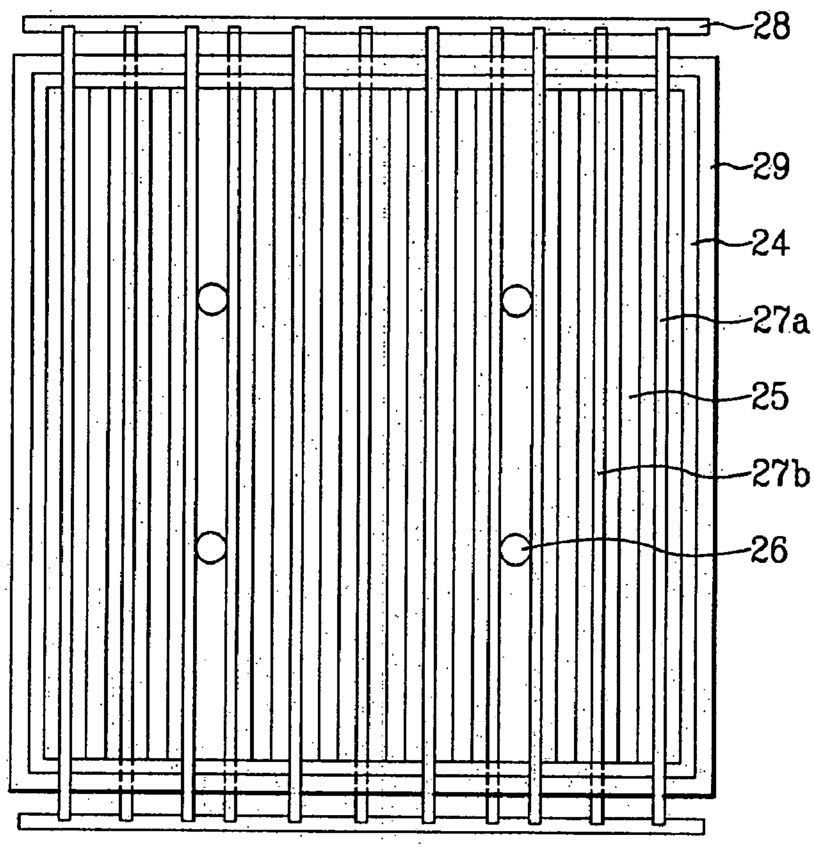

FIGS. 6A to 6C are plan views along II–II' of FIG. 5 of other exemplary wire configurations according to the present invention. In FIG. 6A, a first configuration may include the plurality of first and second wires 27*a* and 27*b* extending along a first direction perpendicular to a second direction of the plurality of fluorescent lamps 25 at fixed intervals along the second direction, wherein the first and second wires 27*a* and 27*b* may be formed to alternate between each other. For example, respective ones of the second wires 27*b* may be formed between respective ones of the first wires 27*a*. Alternatively, the first and second wires 27*a* and 27*b* may be formed to overlap. In addition, each of the plurality of supporters 26 may be provided within a region bound by adjacent ones of the first and second wires 27*a* and 27*b*.

In FIG. 6B, a second configuration may include the plurality of first and second wires 27*a* and 27*b* extending along first and second directions, respectively, at an angle with respect to a third direction of the plurality of fluorescent lamps 25. For example, the plurality of first wires 27*a* may each extend along the first direction at a first angle with the respect to the third direction of the plurality of fluorescent lamps 25, and the plurality of second wires 27*b* may each extend along the second direction at the first angle with the respect to the third direction of the plurality of fluorescent lamps 25. For example, the first angle may be within a range of between about 0° and about 90°. Accordingly, the plurality of first wires 27*a* and the plurality of second wires 27*b* may overlap each other within a central region of the case 29. In addition, each of the plurality of supporters 26 may be provided within a first region bound by adjacent ones of the plurality of first wires 27*a* and within a second region bound by adjacent ones of the plurality of second wires 27*b*.

In FIG. 6C, the plurality of first wires 27*a* and the plurality of second wires 27*b* may extend along a first direction parallel to a second direction of the plurality of fluorescent lamps 25 at fixed intervals along a third direction perpendicular to the first and second directions. The first and second wires 27*a* and 27*b* may be formed to alternate with each other within a region between adjacent ones of the plurality of fluorescent lamps 25. For example, the plurality of first wires 27*a* may be disposed along the third direction at a first interval and the plurality of second wires 27*b* may be disposed along the third direction at a second interval, wherein the first and second intervals may be offset by about one-half of either the first or second intervals. Alternatively, the first and second intervals may be aligned such that the plurality of first wires 27*a* may be disposed to overlap the plurality of second wires 27*b*. In addition, each of the plurality of supporters 26 may be provided within a first region bound by adjacent ones of the plurality of first wires 27*a* and the second plurality of wires 27*b*.

Although not shown in FIG. 6B, the plurality of first and second wires 27*a* and 27*b* may be formed to extend along a single first direction to either overlap each other or be offset from each other. Accordingly, the single first direction may be at a first angle with respect to the third direction of the plurality of fluorescent lamps 25. For example, the first angle may be within a range of between about 0° and about 90°.

In FIGS. 6A and 6B, the wire fixing plates 28 may extend along a direction of the plurality of fluorescent lamps 25, whereas in FIG. 6C the wire fixing plates 28 may extend along a direction perpendicular to the plurality of fluorescent lamps 25. However, in FIGS. 6A, 6B, and 6C, the plurality of first wires 27*a* may be fixed at upper sides of the wire fixing plates 28, and the plurality of second wires 27*b* may be fixed at lower sides of the wire fixing plates 28. In addition, the wire fixing plates 28 may be fixed on an external surface of the case 29. Although not shown, the plurality of first and second wires 27*a* and 27*b* may be formed within a first space between the plurality of fluorescent lamps 25 and the light-scattering system 22. Alternatively, the plurality of first and second wires 27*a* and 27*b* may be formed within a second space between the plurality of fluorescent lamps 25 and the reflecting plate 24.

Figure 7:
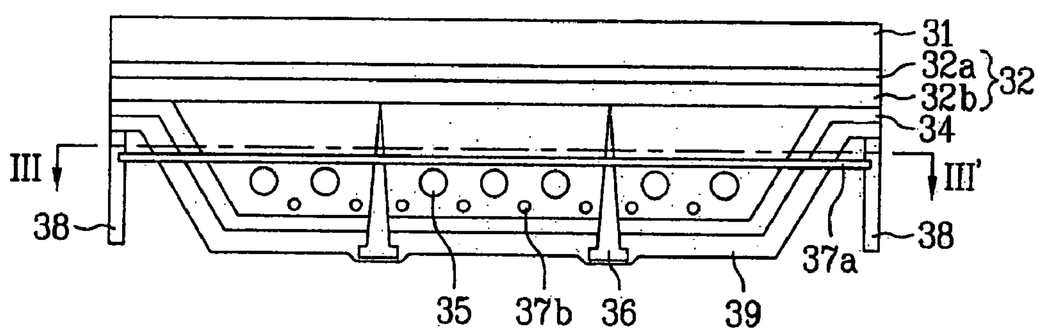
FIG. 7 is a cross sectional view of another exemplary liquid crystal display device according to the present invention.

FIG. 7 is a cross sectional view of another exemplary liquid crystal display device according to the present invention. In FIG. 7, an LCD device may include an LCD panel 31, a plurality of fluorescent lamps 35, a light-scattering system 32, a reflecting plate 34, a case 39, a plurality of first wires 37*a*, a plurality of second wires 37*b*, first wire fixing plates 38*a* (in FIGS. 8A and 8B), second wire fixing plates 38*b* (in FIGS. 8A and 8B), and a plurality of supporters 36. The LCD panel 31 may display images by controlling transmissivity of light produced by the plurality of fluorescent lamps 35 formed below the LCD panel 31 at fixed intervals. The light-scattering system 32 may be formed between the LCD panel 31 and the plurality of fluorescent lamps 35 in order to prevent silhouettes of the plurality of fluorescent lamps 35 from being projected onto a display surface of the LCD panel 31, thereby providing uniform luminescent light. In addition, the reflecting plate 34 may be formed below the plurality of fluorescent lamps 35 to reflect the light emitted from the plurality of fluorescent lamps 35 onto the LCD panel 31, wherein the case 39 may provide support to the plurality of fluorescent lamps 35 and the reflecting plate 34.

The plurality of first wires 37*a* may be formed between the light-scattering system 32 and the plurality of fluorescent lamps 35 along a first direction perpendicular to a second direction of the plurality of fluorescent lamps 35 in order to absorb and dissipate heat generated by the plurality of fluorescent lamps 35. The plurality of second wires 37*b* may be formed between the plurality of fluorescent lamps 35 and the reflecting plate 34 along the second direction parallel to the plurality of fluorescent lamps 35 to absorb and dissipate the heat generated by the plurality of fluorescent lamps 35. The first wire fixing plates 38*a* (in FIGS. 8A and 8B) may fix the plurality of first wires 37*a* onto the case 39, and the second wire fixing plates 38*b* (in FIGS. 8A and 8B) may fix the plurality of second wires 37*b* onto the case 39. In addition, the plurality of supporters 36 may be provided to support the light-scattering system 32. The light-scattering system 32 may include a diffusion plate 32*b* for uniformly diffusing the light emitted by the plurality of fluorescent lamps 35 and an optical sheet 32*a* for concentrating the uniformly diffused light onto the LCD panel 31, thereby improving light luminescence.

Figure 8A:
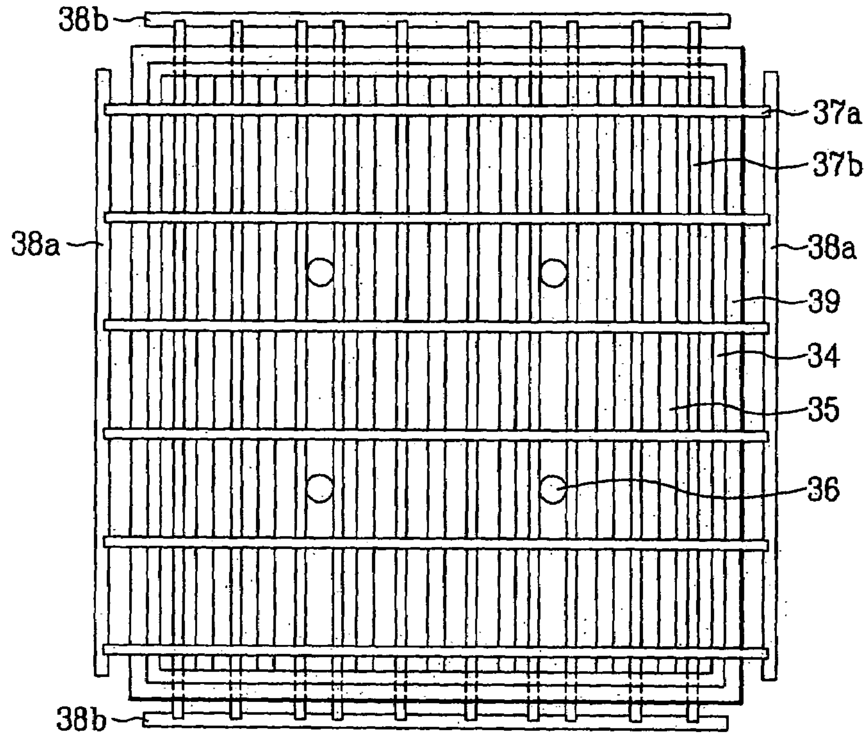
FIGS. 8A and 8B are plan views along III–III' of FIG. 7 of other exemplary wire configurations according to the present invention.
Figure 8B:
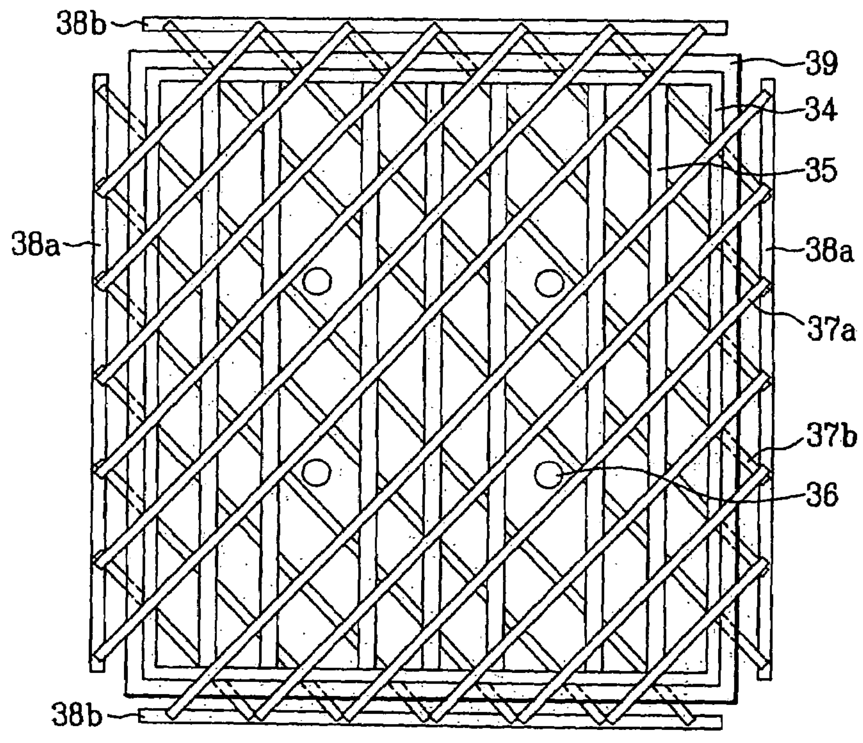

FIGS. 8A and 8B are plan views along III–III' of FIG. 7 of other exemplary wire configurations according to the present invention. In FIG. 8A, a first configuration of the plurality of first wires 37*a* may be formed along the first direction at fixed intervals along the second direction, and may be fixed onto the case 39 by the first wire fixing plates 38*a*. The plurality of second wires 37*b* may be formed along the second direction in parallel to the plurality of fluorescent lamps 35 at fixed intervals along the first direction, and may be fixed onto the case 39 by the second wire fixing plates 38*b*.

Although not shown, the plurality of first wires 37*a* may be formed along the second direction in parallel to the plurality of fluorescent lamps 35 at first fixed intervals along the first direction, wherein the plurality of second wires 37*b* may be formed between adjacent ones of the plurality of first wires 37*a* at the first fixed intervals. Alternatively, the plurality of first and second wires 37*a* and 37*b* may be formed to overlap each other within regions between the plurality of fluorescent lamps 35.

In FIG. 8B, a second configuration of the plurality of first and second wires 37*a* and 37*b* may be formed along first and second directions, respectively, at an angle with respect to a direction of the plurality of fluorescent lamps 35. For example, the plurality of first wires 37*a* may be formed between the plurality of fluorescent lamps 35 and the light-scattering system 32 along a first diagonal direction. Then, the plurality of second wires 37*b* may be formed between the plurality of fluorescent lamps 35 and the reflecting plate 34 at a second diagonal direction, wherein the first and second diagonal directions may form a first angle within a range between about 0° and about 90°. Then, the plurality of first and second wires 37*a* and 37*b* may be fixed along four external sides of the case 39 by the first and second wire fixing plates 38*a* and 38*b*.

Although not shown, the plurality of first and second wires 37*a* and 37*b* may be formed between the plurality of fluorescent lamps 35 and the light-scattering system 32. Alternatively, the plurality of first and second wires 37*a* and 37*b* may be formed between the plurality of fluorescent lamps 35 and the reflecting plate 34.

It will be apparent to those skilled in the art that various modifications and variations can be made in the liquid crystal display device of the present invention without departing from the spirit or scope of the invention. Thus, it is intended that the present invention cover the modifications and variations of this invention formed they come within the scope of the appended claims and their equivalents.

What is claimed is:

1. A liquid crystal display device, comprising:

a liquid crystal display panel;

a plurality of fluorescent lamps formed below the LCD panel extending along a first direction at first fixed intervals along a second direction perpendicular to the first direction and positioned to directly emit light onto the liquid crystal display panel;

a case for supporting the plurality of fluorescent lamps;

a plurality of wires attached to the case for absorbing and dissipating heat generated by the plurality of fluorescent lamps; and wire fixing plates for fixing the plurality of wires on the case.

2. The device according to claim 1, wherein the plurality of wires include:

a plurality of first wires formed between the liquid crystal display panel and the plurality of fluorescent lamps; and a plurality of second wires formed between the plurality of fluorescent lamps and the case.

3. The device according to claim 2, wherein the plurality of first wires and the plurality of second wires extend along the first direction at the first fixed intervals along the second direction.

4. The device according to claim 3, further comprising a plurality of supporters each disposed between adjacent ones of the plurality of first and second wires.

5. The device according to claim 2, wherein the plurality of first wires and the plurality of second wires extend along a third direction at an angle within a range between about 0° and about 90° with respect to the first direction.

6. The device according to claim 5, further comprising a plurality of supporters each disposed between adjacent ones of the plurality of first and second wires.

7. The device according to claim 2, wherein the plurality of first wires extend along the first direction at the first fixed intervals along the second direction and the plurality of second wires extend along the second direction at second fixed intervals along the first direction.

8. The device according to claim 7, further comprising a plurality of supporters each disposed between adjacent ones of the plurality of first and second wires.

9. The device according to claim 2, wherein the plurality of first wires extend along a third direction at an angle within a range between about 0° and about 90° with respect to the first direction.

10. The device according to claim 9, wherein the plurality of second wires extend along a fourth direction at an angle within a range between about 0° and about 90° with respect to the third direction.

11. The device according to claim 2, wherein the plurality of first wires and the plurality of second wires overlap each other.

12. The device according to claim 2, wherein the wire fixing plates include:

first wire fixing plates for fixing the plurality of first wires on the case; and second wire fixing plates for fixing the plurality of second wires on the case.

13. The device according to claim 1, further comprising light-scattering system formed between the liquid crystal display panel and the plurality of fluorescent lamps.

14. The device according to claim 13, wherein the light-scattering system includes:

a diffusion plate for uniformly diffusing the light emitted from the plurality of fluorescent lamps; and an optical sheet for concentrating the uniformly diffused light in the diffusion plate onto the liquid crystal display panel.

15. The device according to claim 13, further comprising a plurality of supporters for supporting the light-scattering system.

16. The device according to claim 1, further comprising a plurality of supporters disposed between the plurality of wires.

17. The device according to claim 16, wherein the plurality of supporters have a conical shape.

18. The device according to claim 1, further comprising a reflecting plate formed between the plurality of fluorescent lamps and the case for reflecting the light produced by the plurality of fluorescent lamps onto the LCD panel.

19. The according to claim 1, wherein the plurality of wires, the case, and the wire fixing plates are formed of at least one of Al-based and Cu-based material.

20. The device according to claim 1, wherein the plurality of wires are fixed onto the wire fixing plates using one of solder and screws.

21. The device according to claim 1, wherein the plurality of wires are formed between the LCD panel and the plurality of fluorescent lamps.

22. The device according to claim 1, wherein the plurality of wires are formed between the plurality of fluorescent lamps and the case.

23. The device according to claim 1, wherein the plurality of wires extend along the second direction at second fixed intervals along the first direction.

24. The device according to claim 1, wherein the plurality of wires extending along the first direction at the first fixed intervals along the second direction.

25. The device according to claim 1, wherein the plurality of wires extend along a third direction at a first angle within a range between about 0° and about 90° with respect to the first direction.

26. The device according to claim 1, wherein the wire fixing plates are fixed on an exterior surface of the case.

27. The device according to claim 2, wherein diameters of the plurality of second wires are larger than the diameters of the plurality of first wires.

28. A liquid crystal display device, comprising:

a liquid crystal display panel;

a plurality of fluorescent lamps formed below the LCD panel extending along a first direction at first fixed intervals along a second direction perpendicular to the first direction and positioned to directly emit light onto the liquid crystal display panel;

a case for supporting the plurality of fluorescent lamps;

a plurality of first wire fixing plates extending along the first direction and disposed adjacent to the case;

a plurality of second wire fixing plates extending along the second direction and disposed adjacent to the case;

a first plurality of wires attached to the plurality of first wire fixing plates for absorbing and dissipating heat generated by the plurality of fluorescent lamps;

a second plurality of wires attached to a plurality of second wire fixing plates for absorbing and dissipating the heat generated by the plurality of fluorescent lamps; and a plurality of supporters disposed between the first and second plurality of wires, wherein the first plurality of wires are formed between the liquid crystal display panel and the plurality of fluorescent lamps and the second plurality of wires are formed between the plurality of fluorescent lamps and the case.

29. The device according to claim 28, wherein the first plurality of wires extend along a third direction at an angle within a range between about 0° and about 90° with respect to the first direction, and the second plurality of wires extend along a fourth direction at an angle within a range between about 0° and about 90° with respect to the third direction.

30. The device according to claim 29, wherein the first plurality of wires are spaced apart by first intervals along the fourth direction, and the second plurality of wires are spaced apart by second intervals along the third direction.

31. The device according to claim 29, wherein end portions of the first plurality of wires are connected to one of the plurality of first wire fixing plates and one of the plurality of second wire fixing plates, and end portions of the second plurality of wires are connected to one of the plurality of first wire fixing plates and one of the plurality of second wire fixing plates.

32. The device according to claim 28, wherein the first plurality of wires extend along the second direction and are spaced apart by first intervals along the first direction, and the second plurality of wires extend along the first direction and are spaced apart by second intervals along the second direction.

33. The device according to claim 28, wherein the first and second plurality of wires extend through sidewall portions of the case.

34. A liquid crystal display device, comprising:

a liquid crystal display panel;

a plurality of fluorescent lamps formed below the LCD panel extending along a first direction at first fixed intervals along a second direction perpendicular to the first direction and positioned to directly emit light onto the liquid crystal display panel;

a case for supporting the plurality of fluorescent lamps;

a plurality of wire fixing plates extending along the first direction and disposed adjacent to the case;

a first plurality of wires and second plurality of wires attached to the plurality of wire fixing plates for absorbing and dissipating heat generated by the plurality of fluorescent lamps; and a plurality of supporters disposed between the first and second plurality of wires, wherein the first plurality of wires are formed between the liquid crystal display panel and the plurality of fluorescent lamps and the second plurality of wires are formed between the plurality of fluorescent lamps and the case.

35. The device according to claim 34, wherein the first plurality of wires are spaced apart by first intervals along the first direction, and the second plurality of wires are spaced apart by second intervals along the first direction.

36. The device according to claim 35, wherein the first plurality of wires are alternately disposed between the second plurality of wires.

37. The device according to claim 35, wherein the first plurality of wires are disposed to overlap the second plurality of wires.

38. The device according to claim 34, wherein the first plurality of wires extend along a third direction at a first angle within a range between about 0° and about 90° with respect to the first direction, and the second plurality of wires extend along a fourth direction at a second angle within a range between about 0° and about 90° with respect to the third direction.

39. The device according to claim 38, wherein the first angle and the second angle are substantially the same.

40. The device according to claim 34, wherein the first and second plurality of wires extend through sidewall portions of the case.

* * * * *